United States Patent
Krumbein et al.

(10) Patent No.: US 11,731,538 B2
(45) Date of Patent: Aug. 22, 2023

(54) SEAT ASSEMBLY AND METHOD OF ASSEMBLY

(71) Applicant: Lear Corporation, Southfield, MI (US)

(72) Inventors: Heike Krumbein, Oberding-Schwaig (DE); Peter Haeussler, Oberding-Schwaig (DE); Julian Kollmann, Oberding-Schwaig (DE)

(73) Assignee: Lear Corporation, Southfield, MI (US)

( * ) Notice: Subject to any disclaimer, the term of this patent is extended or adjusted under 35 U.S.C. 154(b) by 17 days.

(21) Appl. No.: 17/487,356

(22) Filed: Sep. 28, 2021

(65) Prior Publication Data

US 2023/0095604 A1 Mar. 30, 2023

(51) Int. Cl.
*B60N 2/28* (2006.01)
*B60N 2/68* (2006.01)
*B60N 2/70* (2006.01)

(52) U.S. Cl.
CPC ........... *B60N 2/2887* (2013.01); *B60N 2/686* (2013.01); *B60N 2/7035* (2013.01)

(58) Field of Classification Search
CPC ..... B60N 2/2887; B60N 2/686; B60N 2/7035
See application file for complete search history.

(56) References Cited

U.S. PATENT DOCUMENTS

| | | | | |
|---|---|---|---|---|
| 6,322,141 | B1 * | 11/2001 | Dutkievic | B60N 2/5825 297/219.1 |
| 8,740,309 | B2 * | 6/2014 | Kajihara | B60N 2/58 297/452.38 |
| 9,061,619 | B2 * | 6/2015 | Mantke | B60N 2/2887 |
| 9,493,099 | B2 * | 11/2016 | Ruthinowski | B60N 2/7005 |
| 9,656,577 | B2 * | 5/2017 | Sekino | B60N 2/289 |
| 9,783,085 | B2 * | 10/2017 | Nilius | B60N 2/5833 |
| 9,963,052 | B2 | 5/2018 | Wang et al. | |
| 9,981,580 | B2 | 5/2018 | Kumagai et al. | |
| 9,981,581 | B2 | 5/2018 | Okuhara et al. | |
| 10,011,206 | B2 * | 7/2018 | Fujii | B60N 2/6009 |
| 10,189,382 | B2 * | 1/2019 | Sammons | B60N 2/2887 |
| 10,279,710 | B2 | 5/2019 | Wieczorek | |
| 10,773,619 | B1 * | 9/2020 | Hamlin | B60N 2/6027 |
| 11,007,909 | B2 * | 5/2021 | Styn | B60N 2/6009 |
| 2002/0104190 | A1 * | 8/2002 | Moore | B60N 2/2809 16/231 |
| 2016/0325658 | A1 | 11/2016 | Hodgson | |
| 2022/0134918 | A1 * | 5/2022 | Olsson | B60N 2/6009 297/253 |

FOREIGN PATENT DOCUMENTS

WO 0114175 A1 3/2001
WO 2020173884 A1 9/2020

* cited by examiner

*Primary Examiner* — Philip F Gabler
(74) *Attorney, Agent, or Firm* — Brooks Kushman PC

(57) ABSTRACT

A seat assembly and a method of assembly. The seat assembly includes a trim cover assembly and a cushion that defines an opening for receiving a child seat anchor. The trim cover assembly has flaps that are attached to a stiffener. The stiffener is received in the opening and is mounted to the cushion.

19 Claims, 6 Drawing Sheets

SEAT ASSEMBLY AND METHOD OF ASSEMBLY

TECHNICAL FIELD

The invention relates to a seat assembly and a method of assembly. More specifically, the invention relates to a seat assembly and method of mounting a trim cover assembly to a cushion that defines an opening for receiving a child seat anchor.

BACKGROUND

A vehicle seat having a fixation element for a child seat is disclosed in U.S. Pat. No. 10,279,710.

SUMMARY

In at least one embodiment, a seat assembly is provided. The seat assembly includes a cushion and a trim cover assembly. The cushion defines an opening for receiving a child seat anchor. The trim cover assembly includes a cover and a stiffener. The cover has a plurality of flaps that extend into the opening. The stiffener has a plurality of panels. Each panel is pivotally connected to at least one other panel. Each flap is attached to a different panel. The stiffener is received in the opening and engages the cushion.

In at least one embodiment, a method of assembling a seat assembly is provided. The method may include providing a cushion that defines an opening for receiving a child seat anchor and providing a cover that has a plurality of flaps. The plurality of flaps may be attached to a stiffener that has a plurality of panels. The stiffener and the plurality of flaps may be inserted into the opening. The stiffener may engage the cushion to secure the cover.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
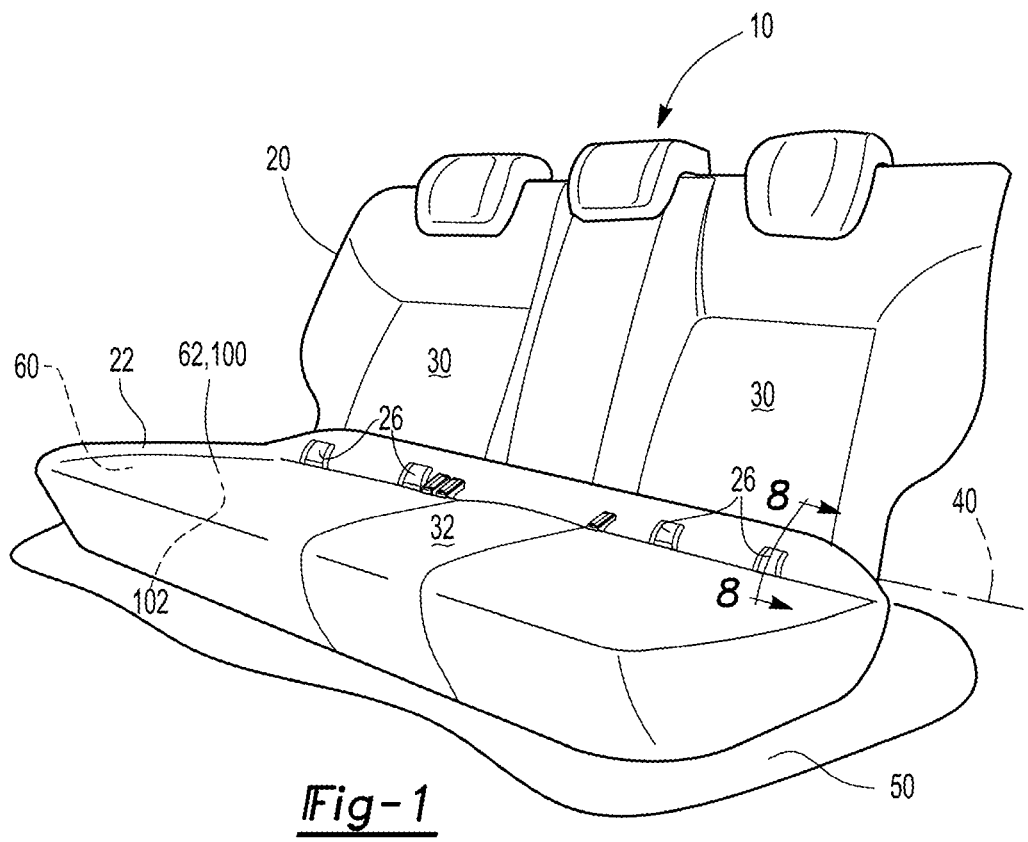
FIG. 1 is a perspective view of an example of a seat assembly having a trim cover assembly.

Referring to FIG. 1, an example of a seat assembly 10 is shown. The seat assembly 10 may be provided with or configured for use with a vehicle, such as a motor vehicle like a car or truck.

Figure 7:
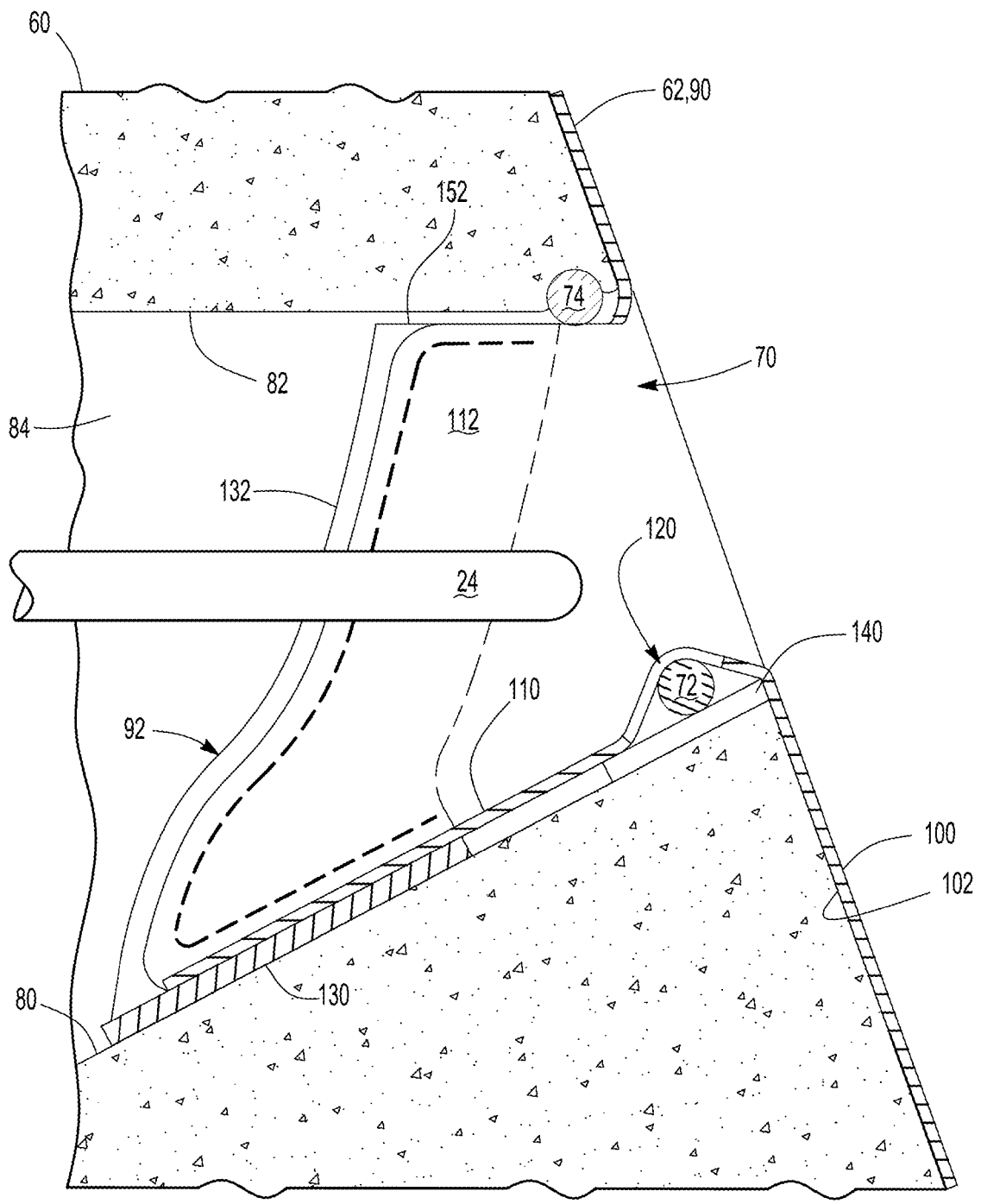
FIG. 7 is a section view of a portion of the seat assembly prior to installing an anchor cover.
Figure 8:
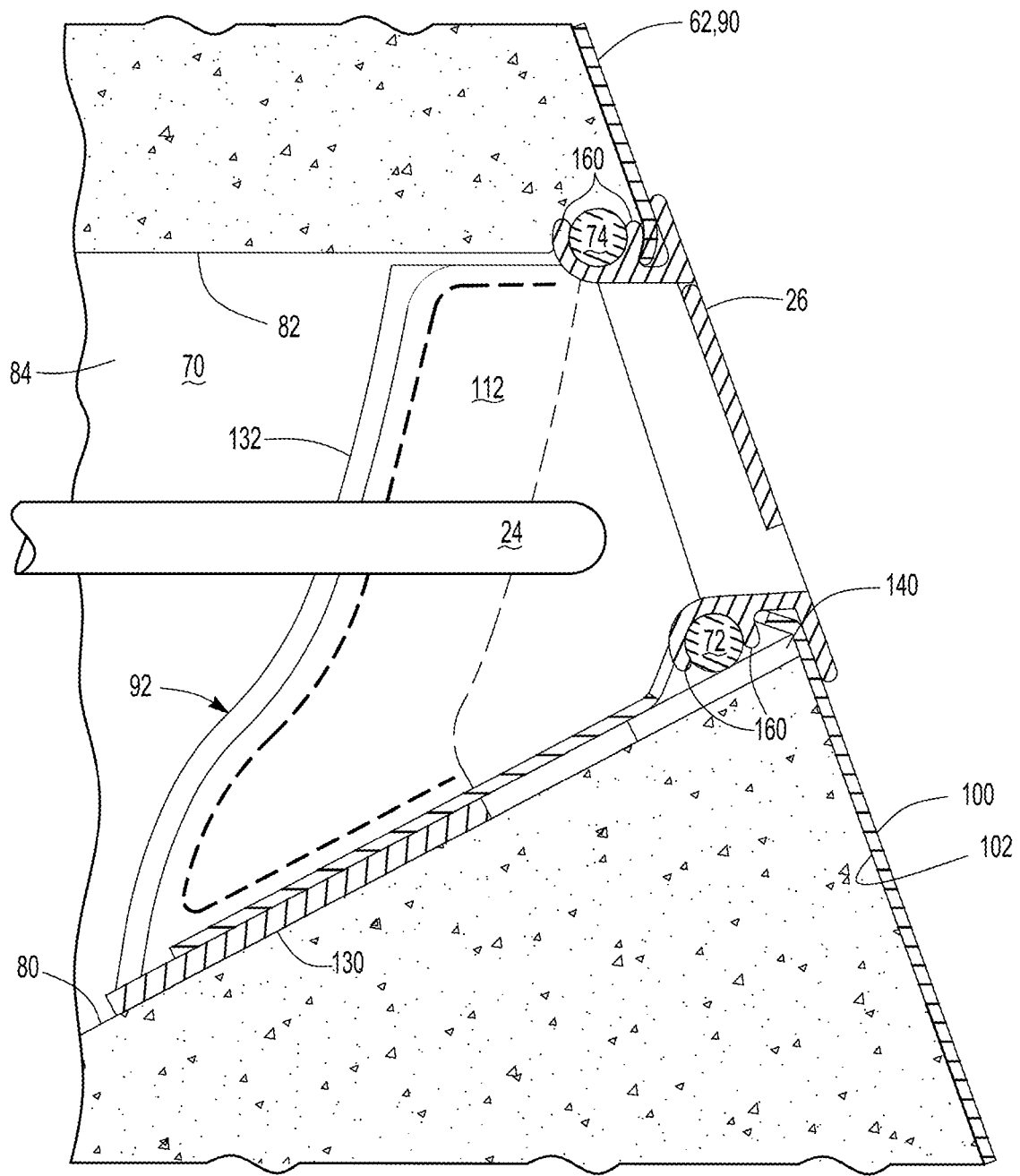
FIG. 8 is a section view of the portion of the seat assembly along section line 8-8 after installing the anchor cover.

The seat assembly 10 may be configured as a rear seat that may be positioned behind a front seating row of the vehicle. For instance, the seat assembly 10 may be positioned behind a front seat that may receive a driver of the vehicle. The seat assembly 10 may include a seat back 20 and a seat bottom 22. The seat assembly 10 may also include at least one child seat anchor 24, an example of which is best shown in FIGS. 7 and 8, and at least one anchor cover 26 as is best shown in FIGS. 1 and 8.

Referring to FIG. 1, the seat back 20 and the seat bottom 22 may cooperate to provide one or more seating positions. For instance, the seat back 20 and seat bottom 22 may cooperate to define one or more primary seating positions 30 and optionally a secondary seating position 32. The secondary seating position 32 may be disposed between two primary seating positions 30 and may be located near or at the center of the seat assembly 10. Optionally, a foldable armrest may be provided in the seat back 20 at the secondary seating position 32.

The seat back 20 may be configured to support the back of a seat occupant. The seat back 20 or one or more portions thereof may be rotatable about an axis 40 with respect to the seat bottom 22. The axis 40 may extend in a generally horizontal direction. The seat back 20 may be disposed proximate the seat bottom 22. For example, the seat back 20 may be disposed above the seat bottom 22. The seat back 20 may or may not be mounted to the seat bottom 22.

The seat bottom 22 may be disposed adjacent to the seat back 20. Like the seat back 20, the seat bottom 22 may also be configured to support a seat occupant. The seat bottom 22 may be configured to be mounted on a vehicle body structure 50 like a floor pan of a vehicle. The seat bottom 22 may include a cushion 60 and a trim cover assembly 62.

Figure 6:
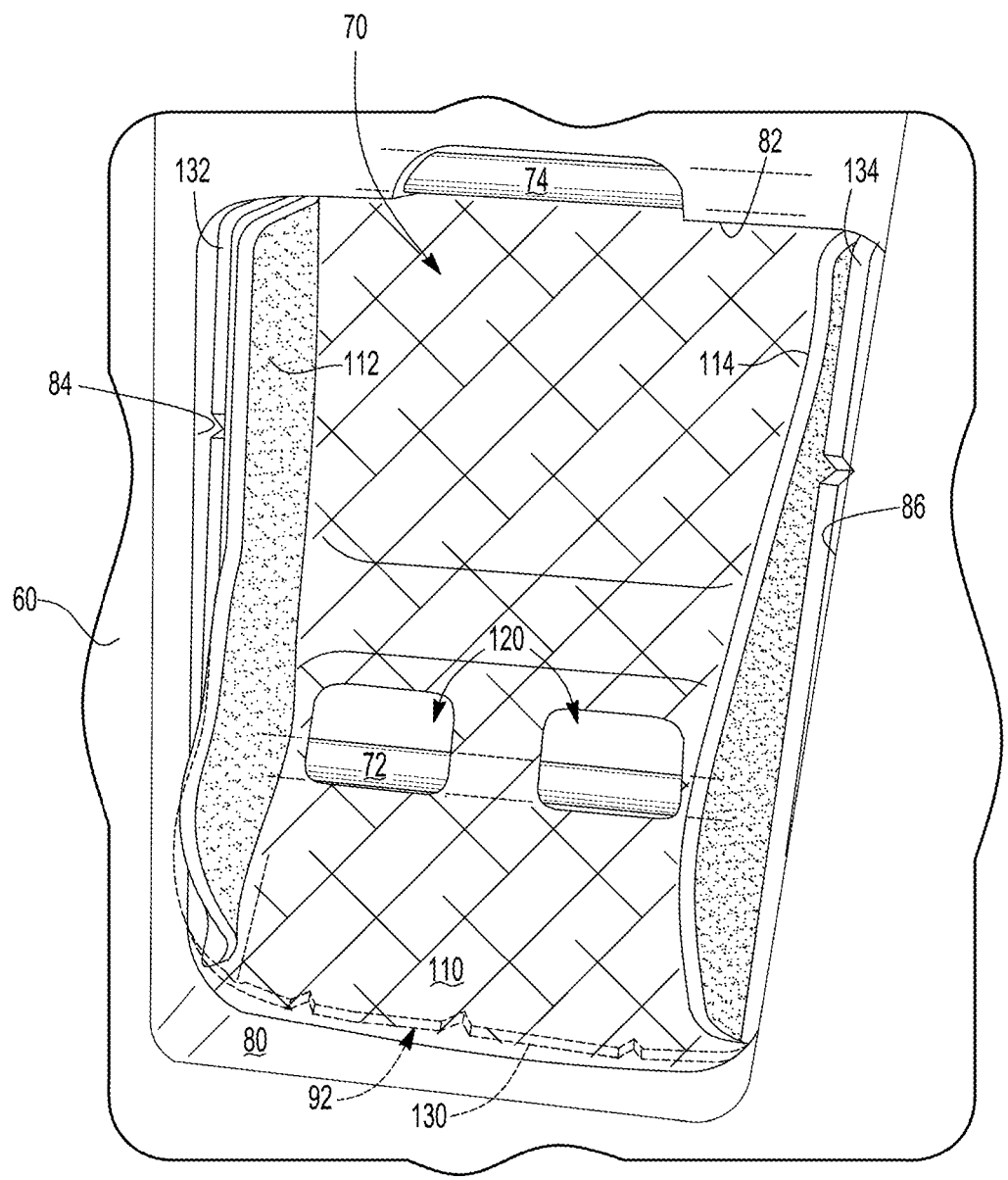
FIG. 6 is a back side view of the cushion after installing the stiffener.

The cushion 60 may be configured to help support a seat occupant. The cushion 60 may be disposed on a support structure of the seat bottom 22, such as a frame or suspension mat. The cushion 60 may be made of any suitable cushion material, such as a molded polymeric material like an open cell foam or a closed cell foam. In at least one configuration, the cushion 60 may define one or more openings 70, an example of which is best shown in FIG. 6. In addition, one or more wires may be provided with the cushion 60, such as a first wire 72 and a second wire 74.

Referring primarily to FIGS. 6 and 7, an opening 70 may receive a child seat anchor 24. In at least one configuration, a pair of openings 70 may be provided at each primary seating position 30. An opening 70 may be configured as a hole such as a through hole that may extend through the cushion 60 and may be bounded by or encircled by the cushion 60. For instance, the opening 70 may be at least partially defined by one or more sides or surfaces of the cushion 60, such as a bottom side 80, a top side 82, a first lateral side 84, and a second lateral side 86.

The bottom side 80 may be disposed at the bottom of the opening 70. The bottom side 80 may extend between the first lateral side 84 and the second lateral side 86 or from the first lateral side 84 to the second lateral side 86.

The top side 82, if provided, may be disposed opposite the bottom side 80. As such the top side 82 may be disposed proximate the top of the opening 70. In at least one configuration, the top side 82 may extend between the first lateral side 84 and the second lateral side 86 or from the first lateral side 84 to the second lateral side 86. In at least one configuration, the top side 82 and the bottom side 80 may be disposed in a non-parallel relationship and the opening 70 may become progressively larger as the distance from the front side of the cushion 60 increases.

The first lateral side 84 may extend from the bottom side 80. For instance, the first lateral side 84 may extend upward or toward the seat back 20 from a first end of the bottom side 80. The first lateral side 84 may extend to the top side 82 in one or more configurations.

The second lateral side 86 may also extend from the bottom side 80. For instance, the second lateral side 86 may be disposed opposite the first lateral side 84 and may extend upward or toward the seat back 20 from a second end of the bottom side 80. The second lateral side 86 may extend to the top side 82 in one or more configurations. In at least one configuration, the first lateral side 84 and the second lateral side 86 may be spaced apart from each other and may be disposed substantially parallel to each other, thereby providing an opening 70 with a parallelogram shape. It is also contemplated that the first lateral side 84 may not be spaced apart from the second lateral side 86 and that the opening 70 may be provided in other configurations or shapes.

The first wire 72 may be at least partially embedded in the cushion 60. In addition, the first wire 72 may be disposed proximate the opening 70. For instance, the first wire 72 may be disposed adjacent to the bottom side 80 and may extend laterally or in a generally horizontal direction. The first wire 72 may facilitate mounting of the trim cover assembly 62, the anchor cover 26, or both as will be discussed in more detail below.

The second wire 74 may be at least partially embedded in the cushion 60. In addition, the second wire 74 may be disposed proximate the opening 70. For instance, the second wire 74 may be disposed adjacent to the top side 82 and may extend laterally or in a generally horizontal direction. As such, the second wire 74 may be disposed above the first wire 72. The second wire 74 may facilitate mounting of the trim cover assembly 62, the anchor cover 26, or both. The second wire 74 may be spaced apart from the first wire 72 or may be contiguous with the first wire 72.

Figure 4:
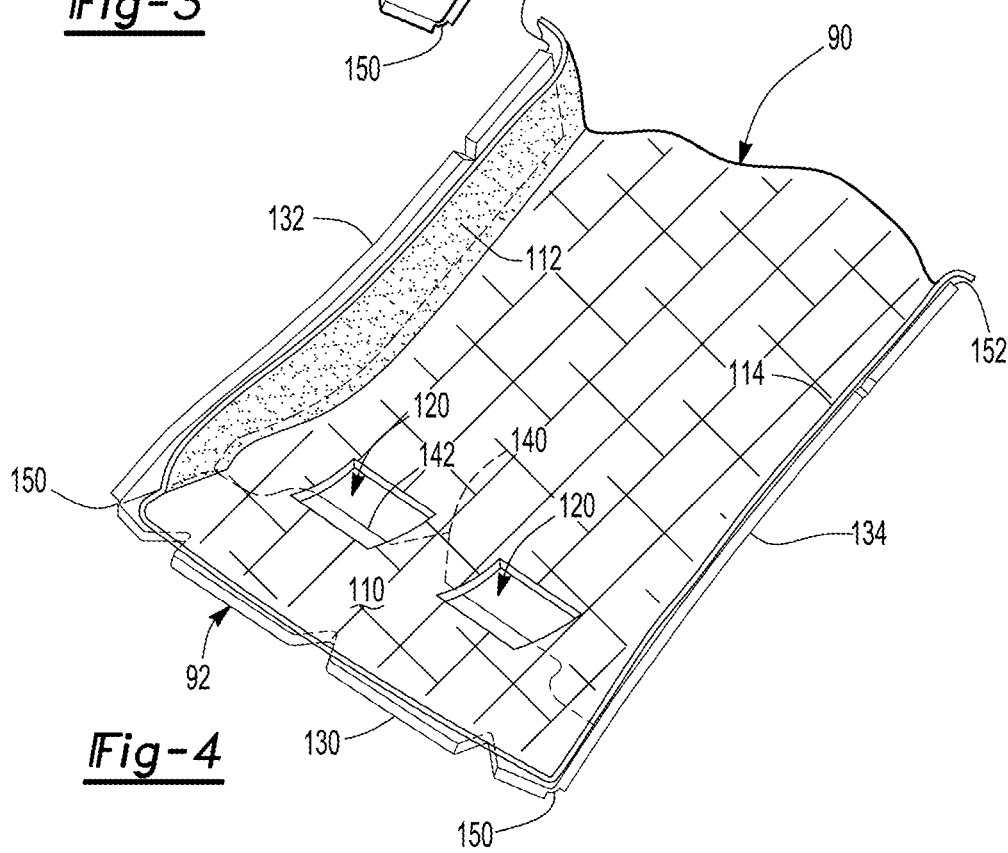
FIG. 4 is a perspective view of the stiffener of FIG. 3 with flaps of a cover attached to the stiffener.
Figure 5:
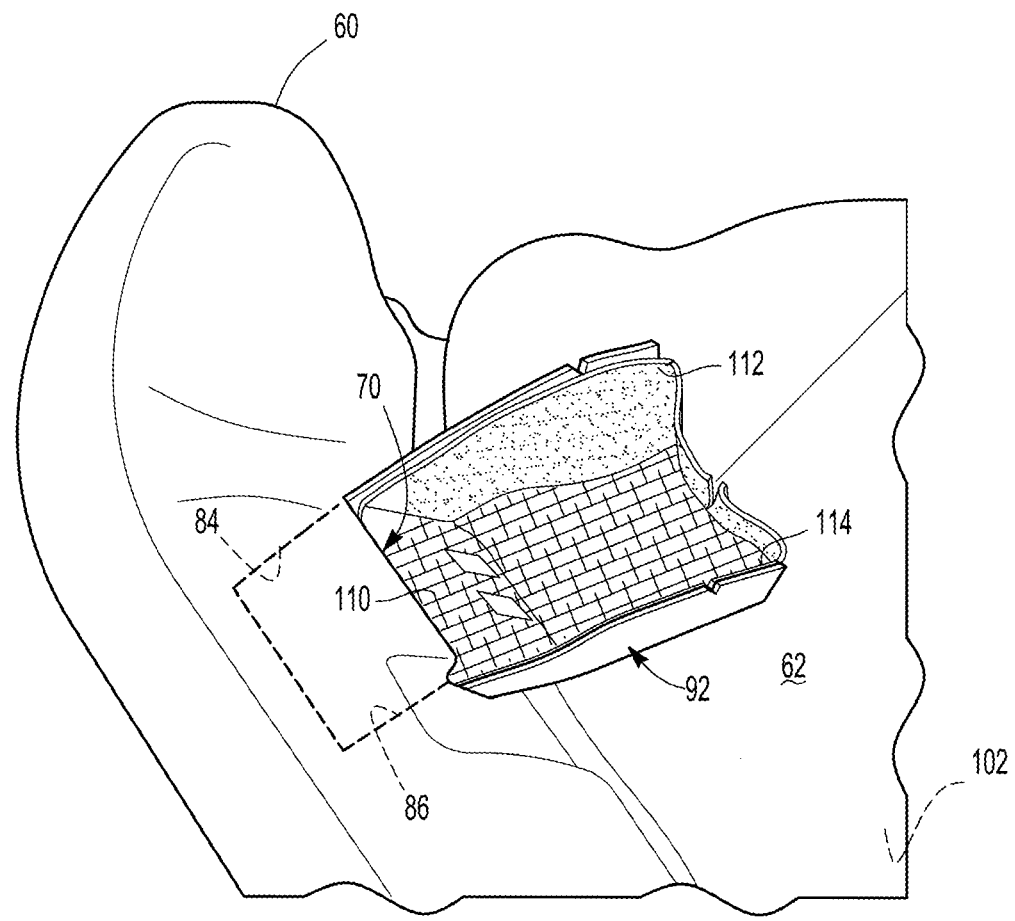
FIG. 5 is a perspective view of the stiffener being inserted into an opening in a cushion of the seat assembly.

Referring primarily to FIGS. 1 and 5, the trim cover assembly 62 may form an exterior surface of at least a portion of the seat assembly 10, such as the seat bottom 22. The trim cover assembly 62 may be disposed on the cushion 60. In addition, the trim cover assembly 62 may engage and may at least partially cover or conceal the cushion 60. For example, the trim cover assembly 62 may extend across a front side of the cushion 60 that may be configured to face toward a seat occupant. In addition, the trim cover assembly 62 may extend across opposing lateral sides of the cushion 60. A portion of the trim cover assembly 62 may be mounted on the seat bottom 22 in any suitable manner. For example, a portion of the trim cover assembly 62 may be secured with one or more attachment features, such as a hook, clip, ring, hook and loop fastener like Velcro®, a drawstring, or the like. In at least one configuration and as is best shown in FIGS. 4 and 5, the trim cover assembly 62 may include a cover 90 and at least one stiffener 92.

The cover 90, which may also be referred to as a trim cover, may form at least a portion of the visible exterior surface of the trim cover assembly 62. The cover 90 may include one or more layers that may be made of any suitable material or materials, such as fabric, vinyl, leather, fleece, foam, or combinations thereof. The cover 90 may include a first side 100, a second side 102, and a plurality of flaps that may extend into an opening 70 of the cushion 60. In at least one configuration, the plurality of flaps may include a center flap 110, a first side flap 112, and a second side flap 114. It is contemplated a set of flaps may be provided for each opening 70.

Referring to FIG. 1 the first side 100 may be a visible exterior side of the cover 90. The first side 100 may face away from the cushion 60.

Referring to FIGS. 1 and 5, the second side 102 may be disposed opposite the first side 100. As such, the second side 102 may face toward the cushion 60 and may engage or contact the cushion 60 when the trim cover assembly 62 is installed over the cushion 60.

Referring to FIGS. 4-8, the center flap 110 may be disposed proximate the bottom side 80 of the cushion 60 that helps define the opening 70 of the cushion 60. In at least one configuration, the center flap 110 may be detached from the first side flap 112 and the second side flap 114. Referring to FIG. 4, the center flap 110 may define at least one flap opening 120. In FIG. 4, two flap openings 120 are shown however, it is contemplated that a greater or lesser number of openings may be provided. FIGS. 7 and 8 are sectioned through a flap opening 120 and show the flap opening 120 as the unsectioned portion of the center flap 110 that is disposed adjacent to the first wire 72. A flap opening 120 may facilitate installation of the anchor cover 26. For instance, a portion of the anchor cover 26 may extend through at least one flap opening 120 to the first wire 72 to facilitate mounting of the anchor cover 26 as will be discussed in more detail below.

Referring primarily to FIGS. 4 and 6, the first side flap 112 may be disposed proximate the first lateral side 84 of the cushion 60 that helps define the opening 70 of the cushion 60.

The second side flap 114 may be disposed proximate the second lateral side 86 of the cushion 60 that helps define the opening 70 of the cushion 60.

Figure 2:
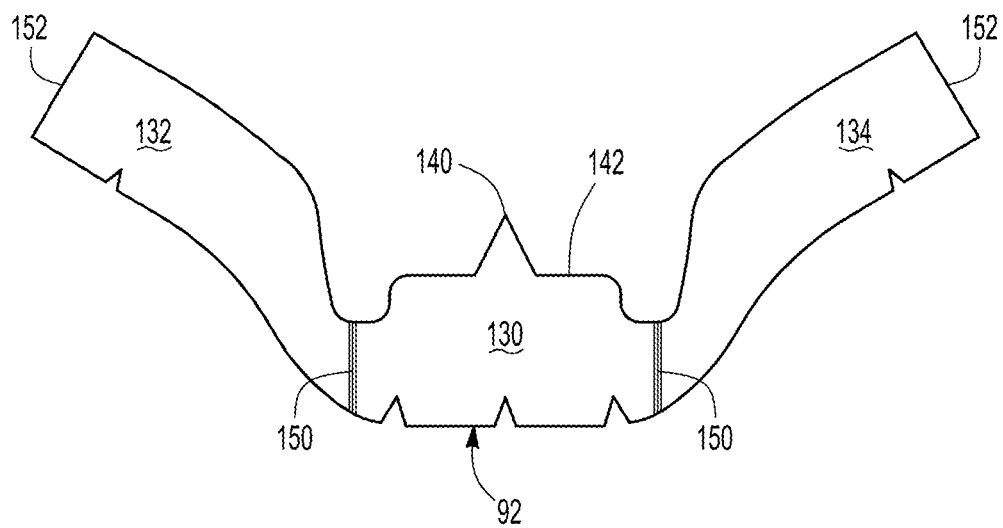
FIG. 2 is a side view of a stiffener that may be provided with the trim cover assembly.
Figure 3:
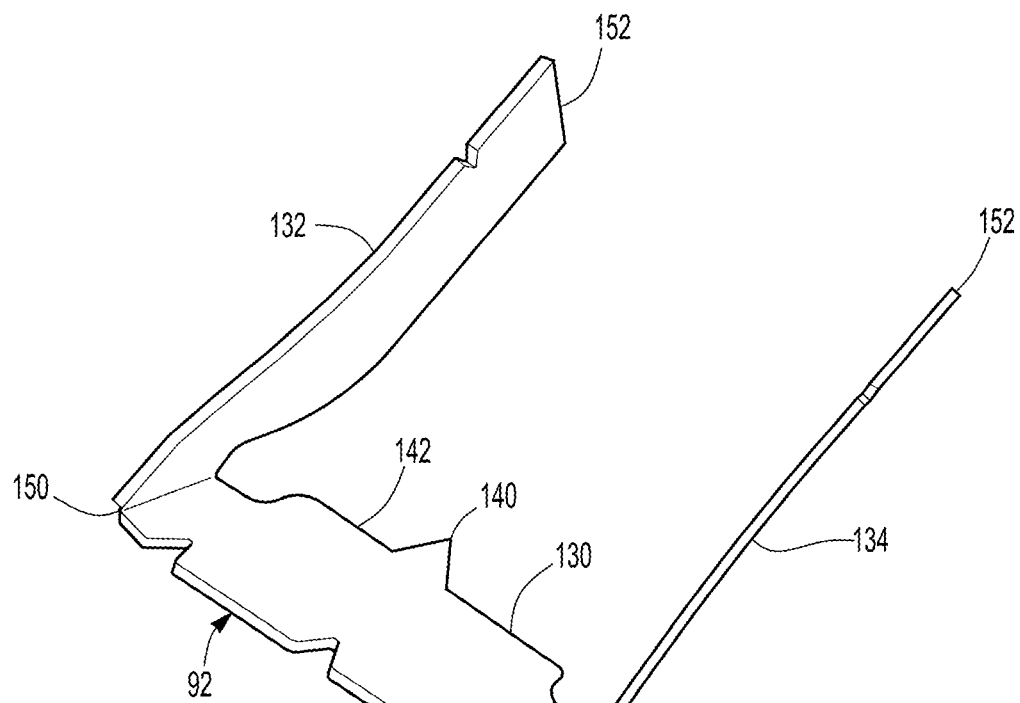
FIG. 3 is a perspective view of the stiffener of FIG. 2 in a folded position.

Referring primarily to FIGS. 2 and 3, an example of a stiffener 92 is shown. The stiffener 92 may be attached to the cover 90. The stiffener 92 may facilitate mounting the trim cover assembly 62 to the cushion 60 adjacent to a child seat anchor 24 or where an opening 70 is provided in the cushion 60. As is best shown in FIGS. 6 and 7, the stiffener 92 may be received in the opening 70 and may be mounted to the cushion 60 or may engage the cushion 60 in a manner that inhibits removal of the stiffener 92 from the opening 70. It is contemplated that a stiffener 92 may be received in each opening 70 of the cushion 60 and that the stiffener 92 may be used instead of other attachment features, such as a clip, ring, hook and loop fastener like Velcro®, and the like for attaching the cover 90 at an opening 70 of the cushion 60 that receives a child seat anchor 24. As such, the stiffener 92 may be self-securing to the cushion 60 and that other attachment features may not be used to couple the stiffener 92 to the cushion 60 or another component.

The stiffener 92 may be a unitary one-piece component. For example, the stiffener 92 may be cut or stamped from a single piece of material or may be a molded part. The stiffener 92 may be made of any suitable material. For instance, the stiffener 92 may be made of a polymeric material. In at least one configuration, the stiffener 92 may be made from a sheet of polypropylene that may have a thickness of less than 5.0 mm, such as a thickness of about 1.5 mm. The material from which the stiffener 92 is made may be less flexible than the material from which the cushion 60 and the cover 90 is made so that the stiffener 92 may remain in place and resist disengagement from the cushion 60 and removal from the opening 70. However, the material of the stiffener 92 may provide some flexibility to facilitate insertion of the stiffener 92 into the opening 70 while allowing the stiffener to maintain its thickness and structural integrity.

Referring primarily to FIGS. 2 and 3, the stiffener 92 may have a plurality of panels. Each panel may be pivotally connected to at least one other panel as will be discussed in more detail below. Each flap of the cover 90 may be attached to a different panel of the stiffener 92. It is also contemplated that one or more flaps may be attached to more than one panel. Attachment of a flap to a panel is represented by a dashed seam line in FIGS. 4, 7, and 8, noting that attachment techniques other than stitching may be used. In at least one configuration, the plurality of panels may include a center panel 130, a first side panel 132, and a second side panel 134.

The center panel 130 may be disposed proximate the center of the stiffener 92. The center panel 130 may include one or more retention features 140 that may help secure the stiffener 92 to the cushion 60. In the configuration shown, a single retention feature is illustrated; however, additional retention features 140 may be provided.

The retention feature 140 may have any suitable configuration. For instance, the retention feature 140 may have a male configuration, female configuration, or combinations thereof, and may be configured as a protrusion, barb, hook, notch, or the like. In at least one configuration, the retention feature 140 may extend from a frontal side 142 of the center panel 130 toward the front side of the cushion 60 or the front side of the seat assembly 10 that may face toward a seat occupant. In the configuration shown, the retention feature 140 has a generally triangular shape and is substantially coplanar with the center panel 130; however, it is contemplated that the retention feature 140 may have a different shape and may extend at an angle or otherwise not be coplanar with the center panel 130. As is best shown in FIG. 7, the retention feature 140 may engage a wire of the cushion 60, such as the first wire 72, to secure the stiffener 92 to the cushion 60. Engagement of the stiffener 92 and the first wire 72 may or may not include contact between the stiffener 92 and the first wire 72. For instance, the stiffener 92 may contact the first wire 72 when there is no intervening cushion material between the stiffener 92 and the first wire 72 or may not contact the first wire 72 when there is intervening cushion material between the stiffener 92 and the first wire 72.

Referring to FIGS. 4 and 7, the center flap 110 of the cover 90 may be attached to the center panel 130. For instance, the center flap 110 may be disposed on a side of the center panel 130 that faces away from the cushion 60. As such, the center panel 130 may contact the cushion 60 and may be disposed between the center flap 110 and the cushion 60 when the stiffener 92 is disposed in the opening 70 of the cushion 60. The center flap 110 may be attached to the center panel 130 in any suitable manner, such as with one or more stitches, an adhesive, a fastener, or combinations thereof. In at least one configuration, the retention feature 140 may be disposed between first and second flap openings 120, 120 in the center flap 110 and may be at least partially overlapped or concealed by the center flap 110.

Referring to FIGS. 2 and 3, the first side panel 132 may extend from and may be attached to the center panel 130. For instance, the first side panel 132 may be disposed at an end of the center panel 130 that may be disposed opposite the second side panel 134.

The first side panel 132 may be pivotally connected to the center panel 130. For instance, the first side panel 132 may be pivotally connected to the center panel 130 with a hinge 150. The hinge 150 may be configured as a living hinge that may be integrally formed with the stiffener 92. For example, a hinge 150 may be configured as an elongated notch or recess that may extend from one side of the stiffener 92 toward an opposite side of the stiffener 92. An elongated notch or recess may extend partially through the thickness of the stiffener 92 and may provide a pivotable connection with sufficient connective material to withstand associated load forces and resist severing the first side panel 132 from the center panel 130.

The first side panel 132 may extend further forward from the frontal side 142 of the center panel 130 than the retention feature 140. As such, the first side panel 132 may extend further from the center panel 130 toward the front of the cushion 60 than the center panel 130 and the retention feature 140. In the configuration shown in FIG. 2, the first side panel 132 becomes larger as it extends away from the hinge 150 toward a distal end 152 of the first side panel 132. In addition, the length of the first side panel 132 from the hinge 150 to the distal end 152 may be greater than the length of the center panel 130 from the first side panel 132 to the second side panel 134.

Referring to FIGS. 2 and 3, the second side panel 134 may extend from and may be attached to the center panel 130. For instance, the second side panel 134 may be disposed at an end of the center panel 130 that may be disposed opposite the first side panel 132. In at least one configuration, the second side panel 134 may have mirror symmetry with respect to the first side panel 132. Thus, attributes of the first side panel 132 may apply to the second side panel 134.

The second side panel 134 may be pivotally connected to the center panel 130, such as with a hinge 150, which may be configured as previously described. In at least one configuration, the hinge 150 that pivotally connects the second side panel 134 to the center panel 130 may be spaced apart from and may be disposed substantially parallel to the hinge 150 that connects the first side panel 132 to the center panel 130. The term "substantially parallel" as used herein means the same as or very close to parallel and includes features or axes that are within ±2° of being parallel each other.

Referring to FIGS. 4 and 6, the second side flap 114 of the cover 90 may be attached to the second side panel 134. For instance, the second side flap 114 may be disposed on a side of the second side panel 134 that faces away from the cushion 60. As such, the second side panel 134 may contact the cushion 60 and may be disposed between the second side flap 114 and the cushion 60 when the stiffener 92 is disposed in the opening 70 of the cushion 60. The second side flap 114 may be attached to the second side panel 134 in any suitable manner, such as with one or more stitches, an adhesive, a fastener, or combinations thereof.

It is also contemplated that the positioning of one or more flaps may be reversed with respect to the stiffener 92 and that a flap may be positioned between a panel of the stiffener 92 and the cushion 60.

Referring to FIGS. 7 and 8, one or more child seat anchors 24 may be provided that may facilitate mounting of a child seat. In the seat configuration shown in FIG. 1, four child seat anchors 24 are provided and are concealed by corresponding anchor covers 26; however, it is contemplated that a different number of child seat anchors 24 may be provided with the seat assembly 10. The child seat anchors 24 may be Isofix anchors that may allow a compatible child safety seat to be secured to the vehicle, such as without the use of a vehicle seatbelt. As an example, a child seat anchor 24 may be generally configured as a rectangular ring that may be fixedly connected to a structural member, such as the vehicle body structure 50 or the support structure or frame of the seat assembly 10. The child seat anchor 24 may be disposed proximate the cushion 60. For instance, the child seat anchor 24 may extend partially into the opening 70 in the cushion 60 and may be spaced apart from the trim cover assembly 62. As such, the child seat anchor 24 may be positioned above the center flap 110 of the cover 90 and may be positioned laterally between the first side flap 112 and the second side flap 114.

Referring to FIGS. 1 and 8, an anchor cover 26 may be associated with a child seat anchor 24. For example, the child seat anchor 24 may be received in a corresponding opening 70 of the cushion 60 and may be concealed by an associated anchor cover 26 when a child seat is not coupled to the child seat anchor 24. As such, the anchor cover 26 may help conceal the child seat anchor 24, the cushion 60, or both, to provide a desired aesthetic appearance, yet provide access to the child seat anchor 24 for securing a child seat.

As is best shown in FIG. 8, the anchor cover 26 may extend partially into the opening 70 in the cushion 60 and may be mounted to the cushion 60. For instance, the anchor cover 26 may be mounted to the first wire 72, the second wire 74, or both. In at least one configuration, the anchor cover 26 may include one or more hooks 160 that may facilitate mounting of the anchor cover 26. For example, a hook 160 may extend through one or more flap openings 120 in the center flap 110.

The anchor cover 26 may have any suitable configuration. For instance, the anchor cover 26 may include a bezel and a cover. The bezel may be stationary and may extend around or may encircle the cover. The bezel may extend partially into the opening 70 of the cushion 60 and may engage a portion of the center flap 110, first side flap 112, and the second side flap 114. The cover may pivot with respect to the bezel between a closed position in which the cover conceals the child seat anchor 24 and an open position in which the cover is positioned to allow access to the child seat anchor 24.

A method of assembly will now be described. The method will primarily be described in the context of assembling the cover 90 and the stiffener 92 and installation of these components with respect to the cushion 60. The cover 90 and the stiffener 92 may initially be provided as separate unassembled components. It is contemplated that the main body of the cover 90 from which the flaps extend may be fitted over the outside of the cushion 60 and secured before or after the stiffener 92 is inserted into the opening 70.

First, the flaps of the cover 90 may be attached to the stiffener 92. The center flap 110 may be attached to the center panel 130, the first side flap 112 may be attached to the first side panel 132, and the second side flap 114 may be attached to the second side panel 134 as previously discussed.

Next, the stiffener 92 may be folded to facilitate insertion into the opening 70 of the cushion 60. For instance, the stiffener 92 may be folded along its hinges 150 like what is shown in FIG. 4 such that the first side flap 112 and the second side flap 114 may be folded toward each other to make the stiffener 92 more compact and easier to insert into the opening 70.

Next, the stiffener 92 and the flaps of the cover 90 that are attached to the stiffener 92 may be inserted into the opening 70 of the cushion 60. The stiffener 92 and flaps may be inserted in a direction that extends from the front side of the seat assembly 10 or side of the seat assembly that faces toward a seat occupant into the opening 70, and toward an opposing back side that may face away from a seat occupant. The stiffener 92 may be oriented such that the center panel 130 faces toward the bottom side 80 of the opening 70, the first side panel 132 faces toward the first lateral side 84, and the second side panel 134 faces toward the second lateral side 86 like the positioning shown in FIG. 5.

The stiffener 92 may be inserted into the opening 70 above the first wire 72 and below the second wire 74 like what is shown in FIGS. 6 and 7. In addition, the stiffener 92 may be inserted by a sufficient distance or depth to allow the retention feature 140 of the center panel 130 to engage, grasp, or hook onto the first wire 72. For instance, the stiffener 92 may be inserted such that the center panel 130, the retention feature 140, and the center flap 110 pass over the first wire 72 and then the stiffener 92 may be maneuvered to position the retention feature 140 underneath the first wire 72 as shown in FIG. 7. As a result, the retention feature 140 may extend underneath and may engage the first wire 72 while the center flap 110 of the cover 90 may extend over and may engage the first wire 72. As a result, the center flap 110 and the center panel 130 may cooperate to partially extend around the first wire 72 (i.e., the first wire 72 may be disposed between the retention feature 140 and the center flap 110) when the stiffener 92 is mounted to the cushion 60.

Depending on the extent to which the first side panel 132 and second side panel 134 were folded toward each other, the first side panel 132 and the second side panel 134 may be unfolded or extended away from each other such that the first side panel 132 and the second side panel 134 may extend along the first lateral side 84 and the second lateral side 86, respectively. Such unfolding may occur when the stiffener 92 is released due to tension exerted by the cover 90. The distal end 152 of the first side panel 132 and the distal end 152 of the second side panel 134 may extend toward and may be disposed proximate the second wire 74 and may engage a side of the cushion 60, such as the top side 82, to help further secure the stiffener 92 to the cushion 60 and keep the cover 90 taut against the cushion 60 with a wrinkle-free appearance. As such, the second wire 74 may help resist removal of the stiffener 92 from the opening 70.

Next, the anchor cover 26 may be installed as shown in FIG. 8. Installing the anchor cover 26 may include aligning the anchor cover 26 with the opening 70, partially inserting the anchor cover 26 into the opening 70, and securing the anchor cover 26 to the cushion 60. For instance, the anchor cover 26 may be secured to the first wire 72 and/or the second wire 74 of the cushion 60 with hooks 160 as previously described to inhibit removal of the anchor cover 26 from the opening 70.

A seat assembly as described above may allow a cover to be installed on a seat cushion in a quick and effective manner. Multiple flaps of a cover may be secured with one stiffener rather than by attaching flaps individually to another component, which may reduce installation time. Moreover, flaps may be secured without the need for separate fasteners and in a manner that provides a desired aesthetic appearance.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A seat assembly comprising:
   a cushion that defines an opening for receiving a child seat anchor, wherein the cushion includes a first wire that is partially embedded within the cushion and partially disposed in the opening; and
   a trim cover assembly that includes:
      a cover that has a plurality of flaps that extend into the opening; and
      a stiffener that has a plurality of panels, wherein each panel is pivotally connected to at least one other panel, each flap is attached to at least one panel, and the stiffener is received in the opening and engages the cushion, wherein the stiffener has a retention feature that extends from the cushion to the first wire.

2. The seat assembly of claim 1 wherein the seat assembly includes a seat bottom, the cushion is provided with the seat bottom, and the opening is configured as a through hole that extends through the cushion.

3. The seat assembly of claim 1 wherein the first wire extends from the retention feature to the cover.

4. The seat assembly of claim 1 wherein an anchor cover is mounted to the first wire.

5. The seat assembly of claim 1 wherein the plurality of panels are pivotally connected with living hinges.

6. The seat assembly of claim 1 wherein the plurality of panels includes a center panel, a first side panel, and a second side panel, wherein the first side panel and the second side panel are disposed opposite each other, are separated from each other, and are pivotally connected to the center panel.

7. The seat assembly of claim 6 wherein the plurality of flaps includes a center flap, a first side flap, and a second side flap, wherein the center flap is attached to the center panel, the first side flap is attached to the first side panel, and the second side flap is attached to the second side panel.

8. The seat assembly of claim 7 wherein the center flap defines at least one flap opening that is disposed adjacent to the first wire.

9. The seat assembly of claim 7 wherein the opening is at least partially defined by a bottom side, a first lateral side that extends from the bottom side, and a second lateral side that extends from the bottom side, wherein the center flap is disposed on the bottom side, the first side flap is disposed on the first lateral side, and the second side flap is disposed on the second lateral side.

10. The seat assembly of claim 7 wherein the center flap is disposed on a side of the center panel that faces away from the cushion, the first side flap is disposed on a side of the first side panel that faces away from the cushion, and the second side flap is disposed on a side of the second side panel that faces away from the cushion.

11. A seat assembly comprising:
    a cushion that defines an opening for receiving a child seat anchor, wherein the cushion includes a first wire that is partially embedded within the cushion and partially disposed in the opening; and
    a trim cover assembly that includes:
       a cover that has a plurality of flaps that extend into the opening; and
       a stiffener that has a plurality of panels that are received in the opening, wherein the plurality of panels includes a first side panel and a second side panel that are pivotally connected to a center panel, each flap is attached to a different panel, and the center panel includes a retention feature that contacts a flap and the first wire and secures the stiffener to the cushion.

12. The seat assembly of claim 11 wherein the plurality of flaps includes a center flap to which the center panel is attached, and wherein the retention feature extends from a frontal side of the center flap toward a front side of the seat assembly.

13. The seat assembly of claim 11 wherein the plurality of flaps includes a center flap to which the center panel is attached, and wherein the center flap includes a first flap opening and a second flap opening and the retention feature is disposed between the first flap opening and the second flap opening.

14. The seat assembly of claim 11 wherein the plurality of flaps includes a center flap to which the center panel is attached, and wherein the first wire is disposed between and engages the retention feature and the center flap.

15. The seat assembly of claim 14 wherein the cushion includes a second wire that is at least partially embedded in the cushion and that is disposed above the first wire, wherein an anchor cover is mounted to the first wire and the second wire.

16. The seat assembly of claim 15 wherein the center flap defines at least one flap opening through which the anchor cover extends.

17. The seat assembly of claim 1 wherein the cushion includes a second wire that is partially embedded in the cushion and partially disposed in the opening.

18. The seat assembly of claim 17 wherein the second wire contacts the stiffener.

19. The seat assembly of claim 17 wherein the stiffener contacts the first wire and the second wire.

* * * * *